C. WEBB.
APPARATUS FOR MAKING BOWS OR LOOPED KNOTS.
APPLICATION FILED NOV. 25, 1914.

1,209,525.

Patented Dec. 19, 1916.
6 SHEETS—SHEET 1.

WITNESSES.

INVENTOR
Cyrus Webb

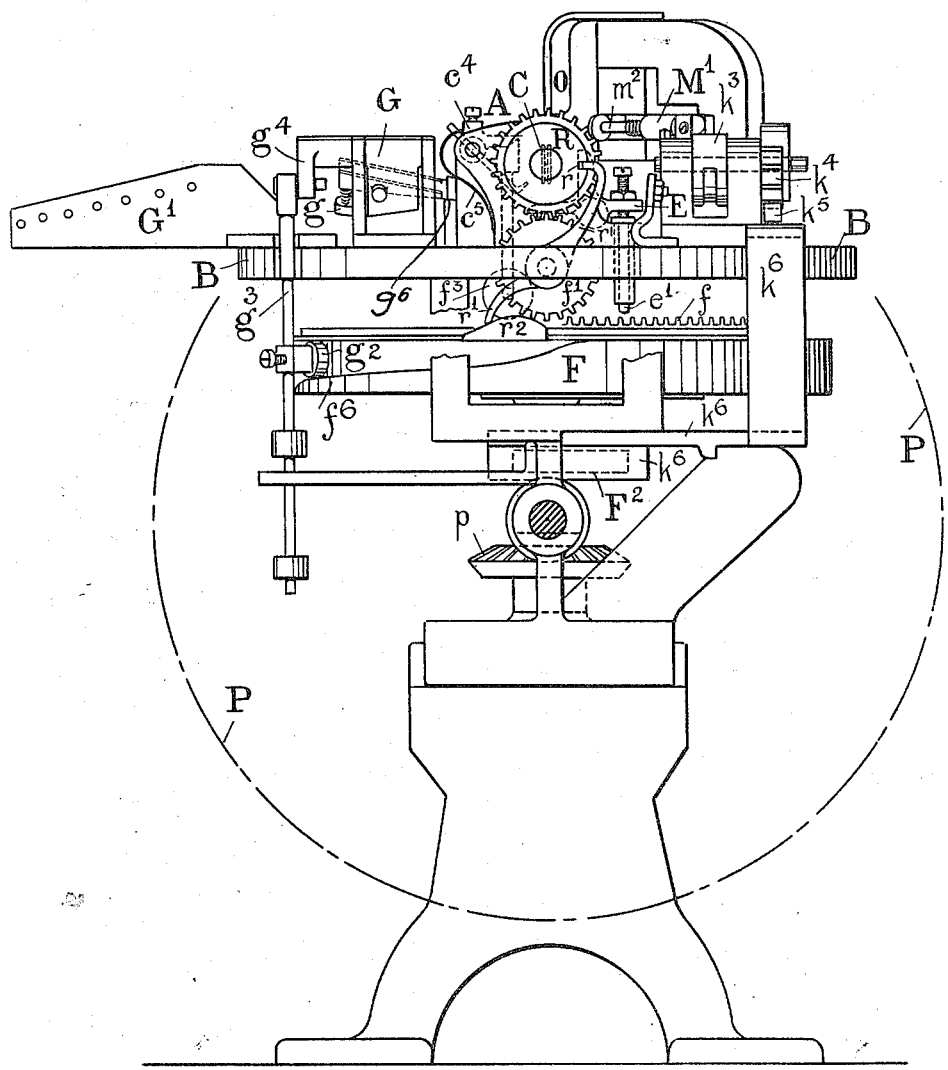

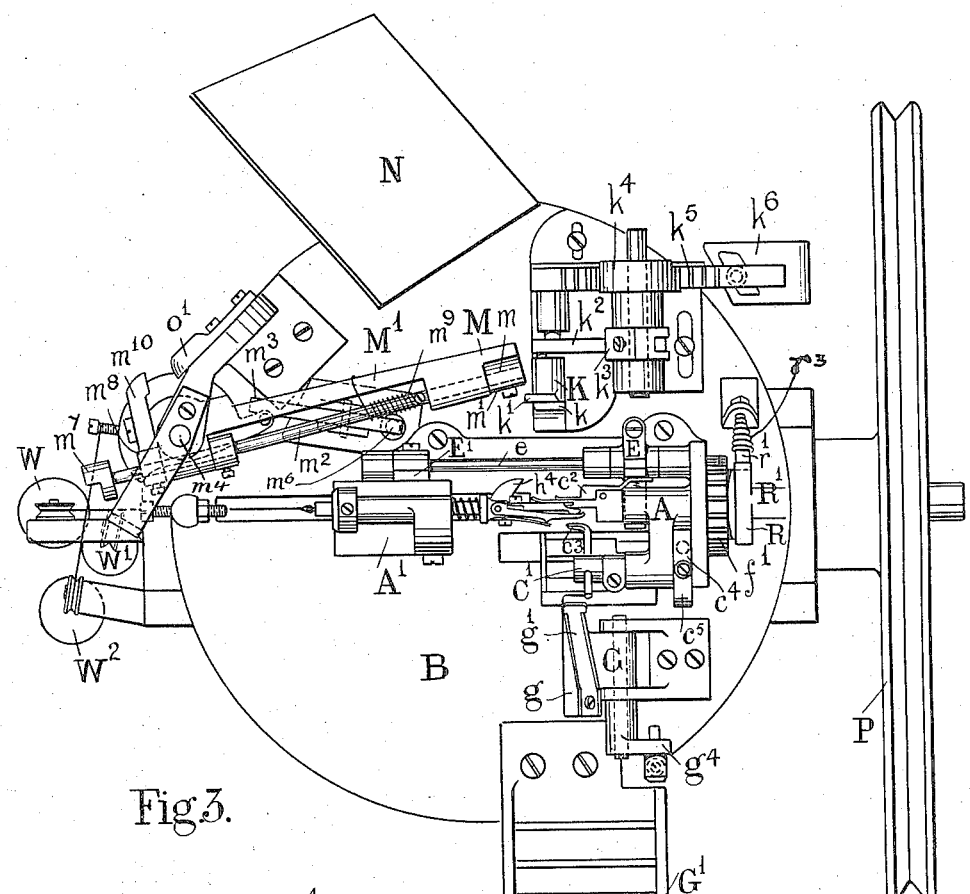
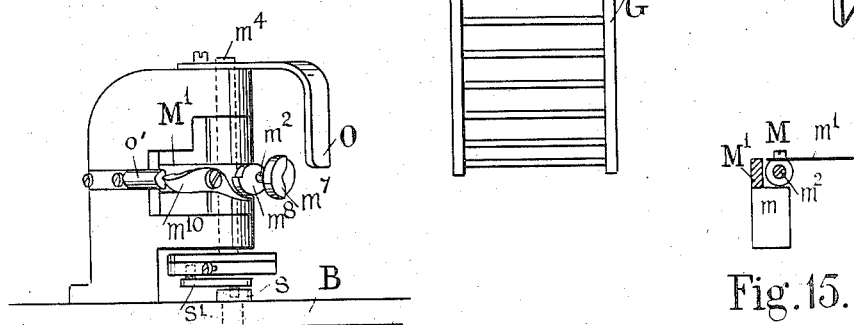

C. WEBB.
APPARATUS FOR MAKING BOWS OR LOOPED KNOTS.
APPLICATION FILED NOV. 25, 1914.

1,209,525.

Patented Dec. 19, 1916.
6 SHEETS—SHEET 5.

WITNESSES.
M. E. McDade
INVENTOR
Cyrus Webb

UNITED STATES PATENT OFFICE.

CYRUS WEBB, OF HAZEL GROVE, ENGLAND, ASSIGNOR TO THE HAT MANUFACTURERS SUPPLY COMPANY, LIMITED, OF STOCKPORT, ENGLAND.

APPARATUS FOR MAKING BOWS OR LOOPED KNOTS.

1,209,525.  Specification of Letters Patent.  Patented Dec. 19, 1916.

Application filed November 25, 1914. Serial No. 874,034.

*To all whom it may concern:*

Be it known that I, CYRUS WEBB, a British subject, residing at Hazel Grove, county of Chester, England, have invented certain new and useful Improvements in Apparatus for Making Bows or Looped Knots, of which the following is a specification.

This invention is designed to provide apparatus for tying or forming small bows or looped knots, from a continuous length of narrow braid, cord or other material, such as are employed in ornamenting or finishing the joints of sweat bands in the interior of hats.

The invention consists in the construction and arrangement of the several parts which will be more fully hereinafter described and claimed.

The invention will be fully described with reference to the accompanying drawings.

Figure 1:
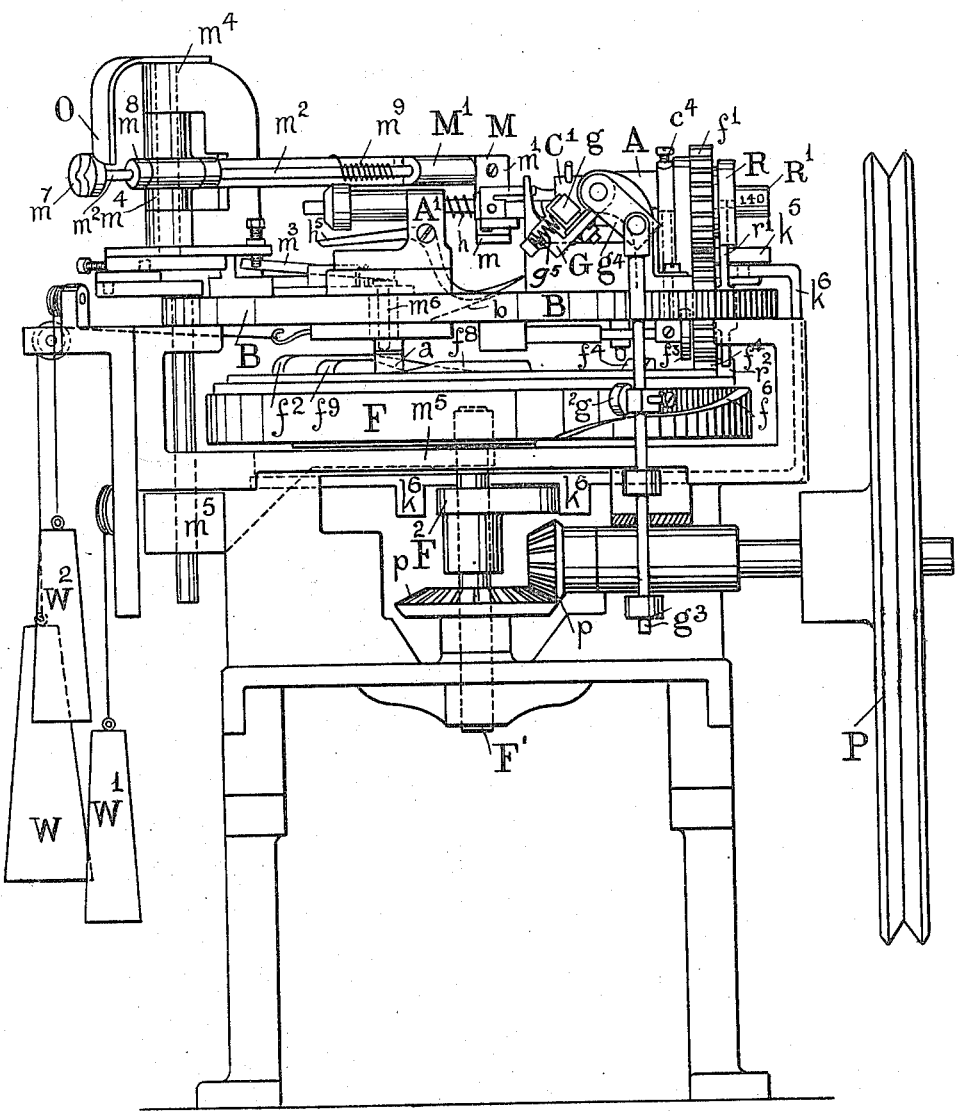
Figure 4:
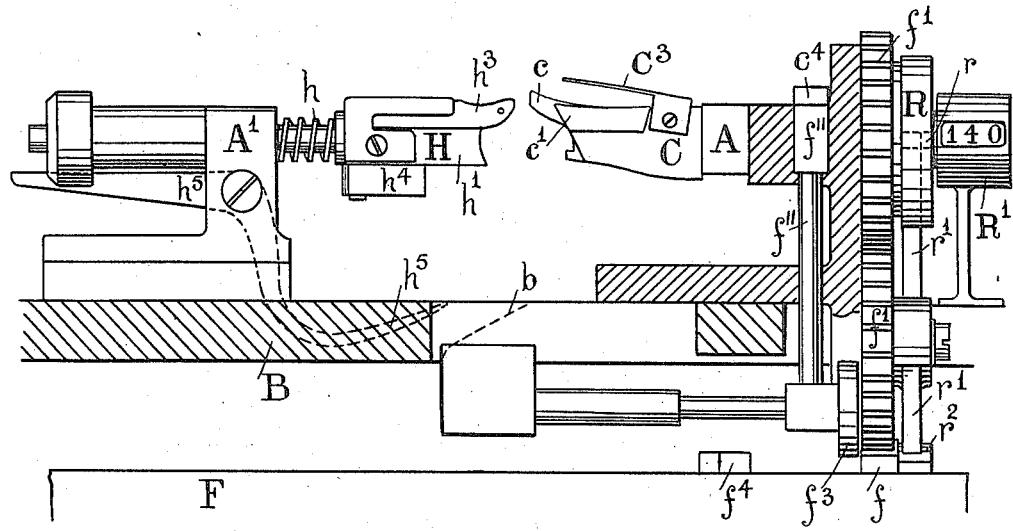
Figure 5:
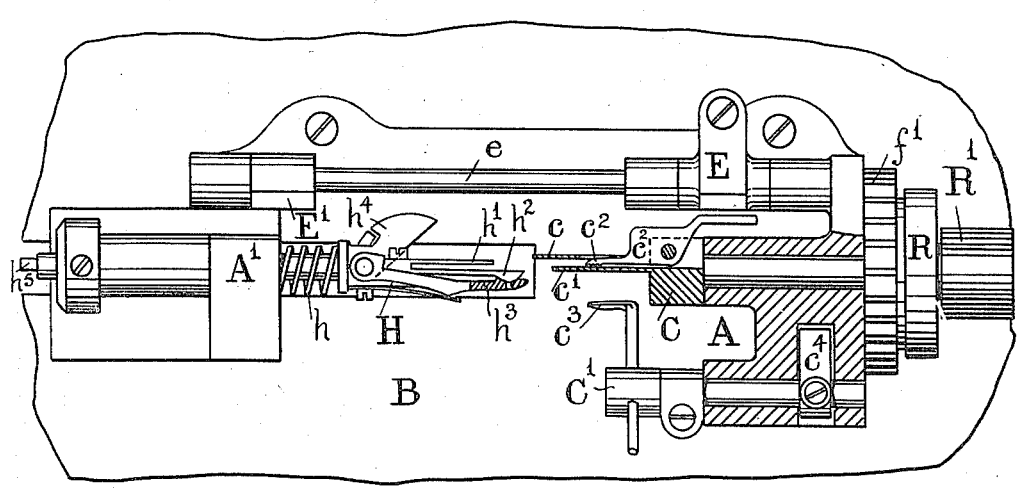
Figure 7:
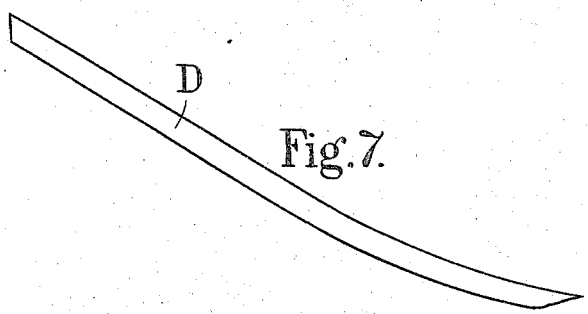
Figures 8, 9, 10:
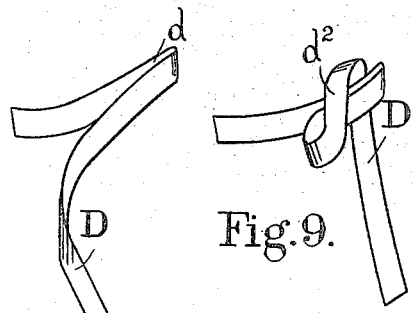
Figure 11:
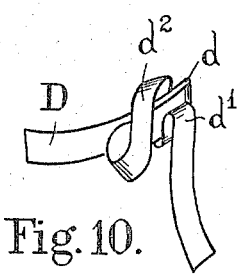
Figure 6:
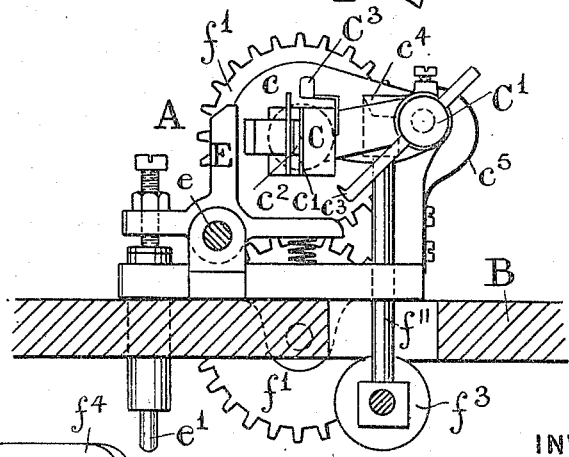
Figure 12:
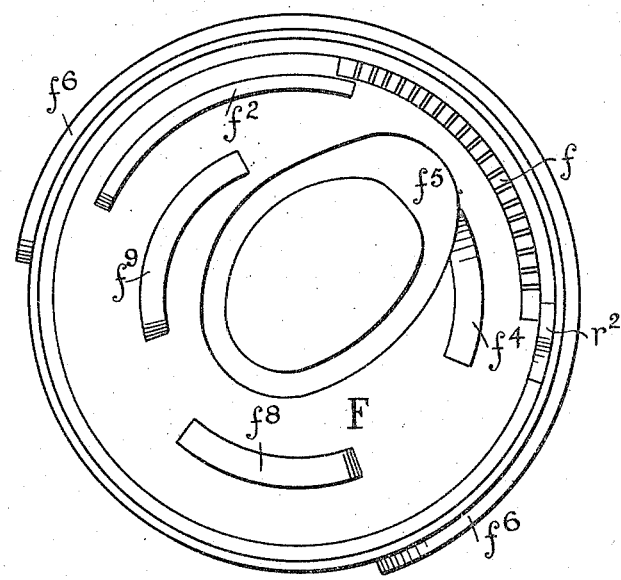
Figure 13:
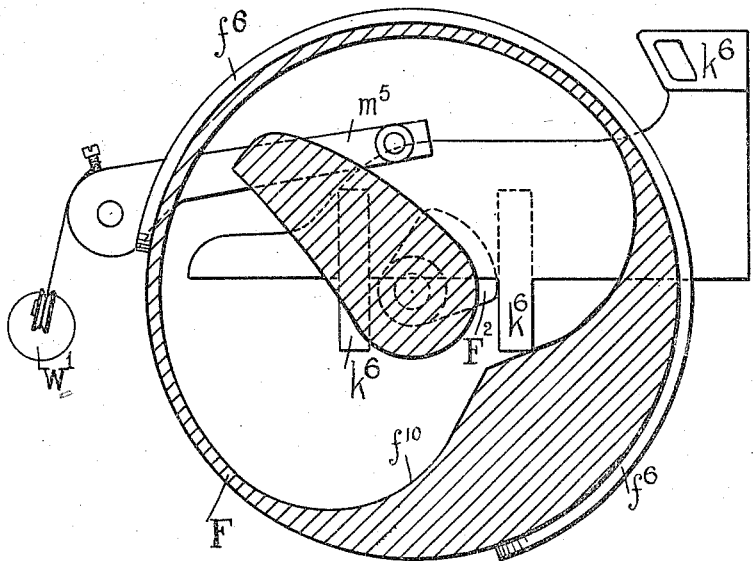

Figure 1. is a front elevation. Fig. 2. is a side elevation. Fig. 3. is a plan. Fig. 4. is a front elevation (enlarged) of the mechanism for looping and tying the bow. Fig. 5. is a plan of same. Fig. 6. is a transverse sectional elevation of same. Fig. 7. is a view of strip of braid. Fig. 8 is a view showing the first loop of the bow. Fig. 9. is a view showing fold to form the knot. Fig. 10. is a view showing second loop. Fig. 11. is a view of the finished bow. Fig. 12. is a plan of the actuating cam F. Fig. 13. is a sectional plan of cam F showing the cam on underside for operating the swinging arm M'. Fig. 14. is an end elevation of swinging arm M' upon which the grippers M are mounted. Fig. 15. is a transverse section through swinging arm M' showing the jaws $m$ $m'$ of the grippers M.

The mechanism by which the loops and knot of the bow are formed comprise two small headstocks A and A' mounted on a table or base B the headstock A being fixed thereto and the headstock A' fitted in slides and capable of being moved to and from the headstock A.

The fixed headstock A is fitted with a rotary arm C with two projecting fingers $c$ $c'$ between which a loop $d$ of the braid D can be forced and a spring controlled rocking or pivoted jaw $c^2$ grips and holds the loop $d$ of the braid when inserted between the fingers $c$ $c'$. An oscillating or rocking arm E mounted on a shaft $e$ controls the movement of the rocking jaw $c^2$ causing it to open and permitting it to close under the action of a spring at the desired periods in the operation of forming the bow. A rocking arm C' is mounted to one side of the rotary arm C and carries near its extremity laterally projecting therefrom a cranked finger $c^3$ which is raised to form the second loop $d'$ of the braid D. Above the fingers $c$ $c'$ a guide finger $C^3$ is mounted around which the knot portion $d^2$ of the braid is wound as the arm C and fingers $c$ $c'$ rotate. The arm C is rotated by a rack $f$ on the face of a rotary cam plate F which engages at intervals with a train of wheels $f'$. The arm C is held locked while the headstock A' is moved forward then allowed to make a complete revolution and locked again while the headstock returns to normal position. On the end of the arm C is mounted a disk R formed with a notch $r$ into which a lever $r'$ engages. The end of the lever $r'$ is withdrawn from the notch $r$ by a cam face $r^2$ on the cam plate F and forced into engagement again by a spring $r^3$. On the end of the arm C a counter R' may be placed. The arm C' is rocked by an upwardly extending cam face $f^2$ on the face of the rotary cam plate F, the cam face $f^2$ engaging at intervals with a runner $f^3$ carried by a vertically reciprocating rod $f^{11}$ whose upper end engages a lever $c^4$ on the arm C'. A curved spring $c^5$ moves the arm in the reverse direction. The arm E is first rocked by cam surface $f^4$ on the cam plate F which engages at intervals with a vertical pin $e'$ whose upper end engages a member of the arm E.

The sliding headstock A' is fitted with a rotary arm H capable of longitudinal movement controlled by a spring $h$, at its free extremity it is fitted with fingers $h'$ $h^2$ which in conjunction with the fingers $c$ $c'$ form the loop $d$ of the braid D. The finger $h^2$ forms a jaw with a pivoted jaw $h^3$ of a gripper between which the loop $d'$ of the braid is held when raised and formed by the cranked finger $c^3$. The jaw $h^3$ is controlled by a cam E' on the shaft $e$ acting against a lever $h^4$ which opens the jaw $h^3$ to release the loop when the bow is finished. The shaft $e$ and the arm E and cam E' are now rocked by the cam surface $f^8$ on the cam plate F acting through the vertical pin $e'$ with which the cam surface $f^8$ engages. When the jaw $h^3$ is opened by the cam E' the rocking jaw $c^2$ is also opened by the arm E to release the finished bow. The sliding headstock is moved forward to carry the loop $d$ between the fingers $c$ $c'$ and back again by a cam $f^5$ on the cam plate F with which a runner $a$ carried on a stud on the underside of the headstock engages. The rotary arm H is locked in its normal position by a key or feather $h^5$ pivoted to the headstock the key being withdrawn as the headstock moves forward by its forward end moving up an incline $b$ on the fixed base B. Rotation is given to the arm H by engagement of the fingers $h'$ $h^2$ thereon with the fingers $c$ $c'$ on the arm C. A weight W may be suspended from the headstock to assist the backward movement.

A swinging arm G is mounted on the base B to one side of the head stock A to turn about 90 degrees, and to it is fitted a trough-shaped guide $g$ through which the braid passes on its way from the tension device G' into the machine between the arms C and H. On the top of the trough shaped guide $g$, which has inclined sides, a flat spring presser $g'$ is disposed, and beneath this presser the braid passes and is forced against the bottom of the delivery end of the guide to direct it centrally between the arms C and H when the guide is in one position, and over and onto the crank finger $c^3$ when the guide is in another position, the movement of the guide from one position to the other, as above stated, being about 90 degrees. During this movement of the braid it is turned from a vertical to a flat or horizontal position, or vice versa. The trough shaped guide $g$ is pivoted to the arm G and a spring at the rear end and a stop at the delivery end thereof bring the guide into correct position. When the braid is carried over onto the crank or finger $c^3$ it forms a second loop $d'$ of the bow, and when the said swinging guide arm moves in an opposite direction to carry the braid in a lateral direction away from the fingers $c$ and $c'$ when one bow is completed the braid is brought into position between the latter fingers and the fingers $h'$ and $h^2$ to commence the first loop $d$ of the next bow. The spring and stop coacting with the opposite ends of the guide $g$ to dispose the latter in correct position are respectively indicated by $g^5$ and $g^6$ on Figs. 1 and 2. The swinging movement is imparted to the arm G by a cam surface $f^6$ on the cam plate F acting upon a bowl or runner $g^2$ on a rod $g^3$ connected to a crank $g^4$ on the arm G. A tension device G' in the form of a ladder directs the braid to the swinging arm G. Shears K with one movable blade are mounted upon the base B on the other side of the rotary arm C to cut off the length of braid to form the bow and to sever the previously formed and completed bow.

The blade $k$ of the shears is fixed and the blade $k'$ is movable. It is mounted on a stud and is connected by a rod or link $k^2$ with a crank $k^3$. The crank $k^3$ is rocked or oscillated by a toothed segment $k^4$ and a sliding reciprocating rack $k^5$ the rack being reciprocated by a cam $F^2$ beneath the cam plate F with which a bracket $k^6$ engages.

Delivery grippers M mounted on a swinging arm M' on the base B take the finished bows from the fingers $h'$ and $h^2$ and deposit them onto a chute N and also draw forward the braid to the desired length to be severed by the shears K for the next bow. The grippers M comprise a fixed jaw $m$ and a movable jaw $m'$ on the end of a rod $m^2$ carried by a swinging arm or bracket M'. The swinging arm M' is mounted upon a vertical rod $m^4$ and is moved in the operative, and in the reverse directions by a cam $f^{10}$ on the under side of the cam plate F with which a runner on the arm or lever $m^5$ engages.

The weights W' W² hold the runner of the arm $m^5$ against the operative face of the cam $f^{10}$ and assist the movement of the swinging arm in the operative direction when drawing forward the braid. The shaft $m^4$ may be a continuous length or it may be divided into two lengths connected by a crank $s$ and a link $s'$ to allow of adjustment of the throw or travel of the arm M'.

The arm M' is arrested on its movement in a direction from the rotary arm C and H and toward the chute N by a stop $m^3$ pivoted to the base B and retained in that position while the shears K sever the braid and is released again by the tilting of the stop $m^3$ which is raised at one end by a rod $m^6$ engaging a cam surface $f^9$ on the cam plate F. On the end of the gripper rod $m^2$ a cam or crank piece $m^7$ is affixed by which the gripper rod is rocked to open the jaw $m'$ and a single notched ratchet $m^8$ by which the jaw $m'$ is held in its open position.

A stop O on the framing is placed in the path of the cam or crank piece $m^7$, as the gripper arm M' swings and causes it to rotate and a pawl $m^{10}$ pivoted to the arm M' engages the notched ratchet $m^8$. A stop $o'$ on the frame in the path of the pawl $m^{10}$ causes the latter to release the ratchet at the end of its return stroke permitting the jaw $m'$ to close by the action of the spring $m^9$.

The machine is driven from any source of power by a wheel P and gearing $p$, onto a vertical shaft F' to which the cams F F² are keyed.

In operation the braid D is led through the tension device G' and the swinging guide arm G horizontally and across the machine between the rotary arms C and H. The guide arm G then swings around to place the braid in a vertical plane between the fingers $c$ $c'$ and the fingers $h'$ $h^2$, the braid having its edges in a vertical plane. The movable headstock A' advances toward the headstock A the finger $h'$ of the rotary arm H comes into contact with the braid D and carries it forward between the fingers $c$ $c'$ of the rotary arm C forming the first loop $d$. When the rotary arm H has advanced to its full extent and the finger $h'$ carrying the braid upon it has passed into the space between the fingers $c$ $c'$ the loop $d$ is held by the jaw $c^2$ a rotary movement to the extent of a complete revolution is imparted to the arm C and by it to the arm H winding the knot $d^2$ of the braid around them. The rotary arms then come to rest and the swinging guide arm G moves through about 90° to the right turning the braid flat or horizontal and laying it over the end $c^3$ of the rocking arm C' the finger $c^3$ rising to form the loop $d'$ which is lifted up between the jaws $h^2$ and $h^3$ and held by them. At this point of the operation the loops $d$ $d'$ of the braid are held by the jaws $c^2$ and $h^3$ respectively and the knot $d^2$ is around the fingers. The next movement is of the sliding headstock A' which is drawn back thereby pulling the loop $d'$ through the knot $d^2$ while the latter slips off and between the fingers and is drawn tight around the loops thereby making the finished bow. Simultaneously with the finishing of the bow the swinging arm M' advances with the jaw $m'$ of the gripper M open and embraces and seizes the bow, the jaws $c^2$ and $h^3$ at the same time releasing the respective loops $d$ and $d'$ held by them. The swinging arm now recedes until arrested by the stop $m^3$, by this action carrying the bow away from the rotary arms C and H drawing forward a fresh supply of braid for the next bow and placing the braid in front of the fixed blade of the shears K. The shears are now operated to sever the finished bow, the swinging arm is released to carry it to the chute N the jaw $m'$ is opened to deposit the bow upon the chute and the cycle of operations is restarted upon the next length of braid.

What I claim as my invention and desire to protect by Letters Patent is:—

1. Apparatus for tying and forming small ornamental bows or looped knots from a strip of material comprising in its construction fixed means provided with a rotary arm having loop formers to fold the material into loops, sliding means movable toward the fixed means to form a knot around the loops and means to operate the loop formers.

2. Apparatus for tying and forming small bows or looped knots from a strip of material comprising in its construction a fixed headstock provided with a rotary arm with fingers or loop formers at the end thereof, and a sliding headstock carrying a rotary arm with fingers or loop formers at the end thereof and means to cause one headstock to approach the other and to effect a rotation in unison of the rotary arms with the fingers.

3. Apparatus for tying and forming small bows or looped knots from a strip of material comprising in its construction a fixed headstock provided with a rotary arm with fingers or loop formers at the end thereof, and a sliding headstock carrying a rotary arm with fingers or loop formers at the end thereof a rocking finger adjacent thereto to raise the material to form the second loop, and shears to sever the material when the loop is formed.

4. Apparatus for tying and forming small ornamental bows or looped knots from a strip of material comprising in its construction fixed means provided with a rotary arm having loop formers to fold the material into loops, sliding means movable toward the fixed means for forming the knot, means for drawing one loop through the knot and tightening the knot around the loops, means for carrying away the finished bows and drawing forward the material for the next bow and means for severing the finished bow.

5. Apparatus for tying and forming small bows or looped knots from a strip of material comprising in its construction a fixed headstock carrying a rotary arm with fingers or loop formers at the end thereof, and a sliding headstock carrying a rotary arm with fingers or loop formers at the end thereof, a rocking finger adjacent thereto to raise the material to form the second loop, and a swinging arm and gripper to seize and carry away the finished bow and draw forward the next length of material.

6. Apparatus for tying and forming small bows or looped knots from a strip of material comprising in its construction a fixed headstock carrying a rotary arm with fingers or loop formers at the end thereof, and a sliding headstock carrying a rotary arm with fingers or loop formers at the end thereof, a rocking finger adjacent thereto to raise the material to form the second loop, a swinging arm and gripper to seize and carry away the finished bow and draw forward the next length of material, and a swinging arm to guide the material into the machine substantially as described.

7. Apparatus for tying and forming small bows or looped knots from a strip of material comprising in its construction a fixed headstock carrying a rotary arm with fingers or loop formers at the end thereof, and a sliding headstock carrying a rotary arm with fingers or loop formers at the end thereof, a rocking finger adjacent thereto to raise the material to form the second loop, and a swinging arm and gripper to seize and carry away the finished bow and draw forward the next length of material, a swinging arm to guide the material into the machine, and rotary cams and connecting mechanism whereby the desired series of movements is imparted to the several parts of the apparatus substantially as described.

In testimony whereof I have hereunto set my hand in presence of two subscribing witnesses, this 11th day of November, 1914.

CYRUS WEBB.

Witnesses:
I. OWDEN O'BRIEN,
GEO. H. O'BRIEN.